(12) United States Patent
Swasand

(10) Patent No.: US 7,958,973 B2
(45) Date of Patent: Jun. 14, 2011

(54) WHEEL CHOCK

(76) Inventor: Brad Swasand, St. Charles, MO (US)

( * ) Notice: Subject to any disclaimer, the term of this patent is extended or adjusted under 35 U.S.C. 154(b) by 998 days.

(21) Appl. No.: 11/780,029

(22) Filed: Jul. 19, 2007

(65) Prior Publication Data

US 2009/0019901 A1 Jan. 22, 2009

(51) Int. Cl.
*B60T 3/00* (2006.01)
(52) U.S. Cl. ....................................................... 188/32
(58) Field of Classification Search .................. 188/30, 188/32, 4 R, 5, 49, 36; 211/20, 21, 23, 24; 70/233–235, 212, 225, 226; 410/30, 49, 410/7, 19; 414/401
See application file for complete search history.

(56) References Cited

U.S. PATENT DOCUMENTS

| | | | | |
|---|---|---|---|---|
| 458,974 | A | * | 9/1891 | Merrill ............................ 211/20 |
| 516,571 | A | | 3/1894 | Moulton |
| 595,891 | A | * | 12/1897 | Robertson ....................... 211/20 |
| 2,671,533 | A | * | 3/1954 | Taylor .............................. 188/32 |
| 2,816,627 | A | * | 12/1957 | Wilson et al. .................... 188/32 |
| 3,430,983 | A | | 3/1969 | Jones |
| 3,542,157 | A | * | 11/1970 | Noah ................................ 188/32 |
| 3,785,517 | A | * | 1/1974 | Brajkovich .................... 414/462 |
| 4,015,718 | A | | 4/1977 | Bernard |
| 4,437,597 | A | | 3/1984 | Doyle |
| 5,464,076 | A | * | 11/1995 | Benedetto, Jr. ................. 188/32 |
| 5,465,814 | A | * | 11/1995 | Ziaylek ........................... 188/32 |
| 5,553,987 | A | * | 9/1996 | Ellis ............................... 414/401 |
| 5,697,629 | A | | 12/1997 | Guild |
| 5,944,198 | A | * | 8/1999 | Ihalainen ......................... 211/5 |
| 5,988,402 | A | | 11/1999 | Mayfield |
| 6,241,104 | B1 | | 6/2001 | Kraus |
| 6,460,743 | B2 | | 10/2002 | Edgerly et al. |
| 6,575,310 | B2 | | 6/2003 | Chamoun |
| 6,640,979 | B1 | | 11/2003 | Mayfield |
| 6,755,309 | B1 | * | 6/2004 | Runge ............................. 211/20 |
| 6,868,998 | B2 | | 3/2005 | Dean |
| 7,150,359 | B1 | | 12/2006 | Lyons et al. |
| 2002/0153207 | A1 | * | 10/2002 | Otaola Amirola ............. 188/2 F |
| 2007/0068881 | A1 | * | 3/2007 | Caponette ....................... 211/20 |
| 2009/0232628 | A1 | * | 9/2009 | Miller ........................... 414/462 |

OTHER PUBLICATIONS

Photographs of "Bike Shoe™"; Websites—http://i8.ebaying.com/03/i/000/9f/f7/7a2e_1.JPG and http://us.st11.yimg.com/us.st.yimg.com/l/pitposse_1950_66178070; May 21, 2007; pp. 1 and 2.
Speed Unlimited; "Thruster TH-2000 Motor Includes Quick Release . . . "; Website—http://cgi.ebay.com/ebaymotors/THRUSTER-TH2000-MOTORCYCLE-WHEEL-CHOCKS; May 21, 2007; pp. 2 and 3 of 5.

* cited by examiner

*Primary Examiner* — Darnell M Jayne
*Assistant Examiner* — Patrick Hawn
(74) *Attorney, Agent, or Firm* — Thompson Coburn LLP

(57) ABSTRACT

A method of chocking a wheel comprises a step of providing a wheel chock. The wheel chock comprises a stationary body and a rocking body. The rocking body is pivotally connected to the stationary body. The method also comprises a step of rolling a wheel into contact with the rocking body in a manner causing the rocking body to rotate to a wheel securing position relative to the stationary body and causing the wheel to reach a chocked position relative to the stationary body. The method further comprises a step of activating a locking mechanism that limits pivotal movement of the rocking body away from the wheel securing position relative to the stationary body. The activating of the locking mechanism occurs while the wheel is in the chocked position. After activating the locking mechanism, the wheel is fully secured to the wheel chock.

10 Claims, 9 Drawing Sheets

WHEEL CHOCK

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to wheel chocks. More particularly, the invention pertains particularly to a wheel chock that is adapted and configured to fully secure a two-wheeled vehicle to an object or surface, such as a trailer, in an upright position.

2. Related Art

Various wheel chocks have been employed that are capable of fully securing a two-wheeled vehicle to an object or surface, such as a trailer, in an upright position. A well known wheel chock used for such purposes is the Bike Shoe™ sold by Pit Posse Motorsports of Saint Petersburg, Fla. The Bike Shoe is similar to, if not the same as, the chock described in U.S. Pat. No. 4,437,597. The Bike Shoe™ is configured to be secured to a trailer or other surface and is configured to receive the front wheel of a motorcycle or other wheeled-vehicle. The Bike Shoe™ is utilized by rolling the wheel forward into a receiving pocket while the wheel remains supported on the surface to which the Bike Shoe™ is secured. Once the tire is positioned in receiving pocket, a person can manually pivot a locking brace over the top-rear portion of the wheel. A locking member is then manually pivoted in a manner that causes the locking brace to bias the top-rear portion of the wheel downward and toward the receiving pocket. As the locking member is pivoted, the pivot point of the brace moves to a position where the biasing force of the locking brace against the wheel acts to prevent the pivot point of the locking brace from returning to its original position. In this locked position, the Bike Shoe™ fully secures the wheel to the wheel chock and to the surface. This locking mechanism of the Bike Shoe™ wheel chock constitutes a type of "over-center" locking mechanism.

A disadvantage of using the Bike Shoe™ wheel chock is that a two-wheeled vehicle must be held upright while a person moves the locking brace against the top-rear portion of the tire. This can be awkward, especially when the vehicle is a relatively heavy motorcycle and the person holding the motorcycle upright is the same person operating the locking mechanism of the wheel chock. Moreover, the person often must reposition the locking brace on the wheel several times until a sufficient compressive force can be exerted on the wheel by the locking brace and the person is still able to apply enough force on the activating member to move it to over-center position (thereby securing the locking brace in place). Additionally, when the surface is not completely horizontal, such is often the case when the surface is a trailer bed, a person may also have to exert a force on the vehicle to maintain the wheel in engagement with the receiving pocket while he or she operates the locking mechanism of the wheel chock and hold the vehicle upright. This disadvantage is exacerbated by the fact that the locking mechanism of the Bike Shoe™ wheel chock is hand operated and difficult to operate while holding a vehicle.

Some wheel chocks are configured to support a two-wheeled vehicle in an upright position simply by engaging a wheel of the vehicle with the wheel chock. Still further, some of such wheel chocks are also configured such that gravity prevents the wheel from rolling off or out of the wheel chock once the wheel is properly engaged with the wheel chock. However, without an additional locking mechanism, such types of wheel chocks are not practical for trailering vehicles since vibrations and bumps can overcome the gravitational force holding the wheel to the wheel chock.

SUMMARY OF THE INVENTION

It is in view of the above problems that the present invention was developed. The preferred embodiment of the invention is a wheel chock that fully supports a two-wheeled vehicle in an upright position and prevents its front wheel from rolling once the vehicle is engaged with the chock. The preferred embodiment of the invention also comprises a locking mechanism that fully secures the wheel to the wheel chock in a manner such that gravity alone is not holding the wheel within or to the wheel chock. Still further, the locking mechanism of the preferred embodiment is foot operable, easy to operate, and applies and maintains a mechanically multiplied clamping force on the wheel when activated. Some of the particular aspects of the invention will now be summarized.

In one aspect of the invention, a method of chocking a wheel comprises a step of providing a wheel chock. The wheel chock comprises a stationary body and a rocking body. The rocking body is pivotally connected to the stationary body. The method also comprises a step of rolling a wheel into contact with the rocking body in a manner causing the rocking body to rotate to a wheel securing position relative to the stationary body and causing the wheel to reach a chocked position relative to the stationary body. The method further comprises a step of activating a locking mechanism that limits pivotal movement of the rocking body away from the wheel securing position relative to the stationary body. The activating of the locking mechanism occurs while the wheel is in the chocked position. When the pivotal movement of the rocking body away from the wheel securing position is limited relative to the stationary body and the wheel is in the chocked position, the wheel is fully secured to the wheel chock.

In another aspect of the invention, a method of chocking a wheel comprises a step of providing a wheel chock. The wheel chock is adjustable between a wheel receiving configuration and a wheel securing configuration and comprises an over-center locking mechanism. The method further comprises a step of rolling a wheel into contact with the wheel chock when the wheel chock is in the wheel receiving configuration. The rolling causes the wheel chock to adjust from the wheel receiving configuration to the wheel securing position as the wheel reaches a chocked position relative to the wheel chock. The method further comprises activating the over-center locking mechanism in a manner securing the wheel chock in the wheel securing configuration when the wheel is in the chocked position.

In yet another aspect of the invention, a wheel chock is adapted to be secured to a wheel and comprises first and second portions and a locking mechanism. The first and second portions are pivotally movable relative to each other. The locking mechanism comprises first and second links. The first link is pivotally connected to the first portion of the wheel chock about a first link axis. The first link is also pivotally connected to the second link about a second link axis. The second link is also pivotally connected to the second portion of the wheel chock about a third link axis. The first, second, and third link axes are parallel to each other. The second link axis is between the first and third link axes. The first and third link axes define a plane extending therethrough. The wheel chock is alternatively positionable in a wheel securing configuration and in a wheel releasing configuration via pivotal movement of the first and second links relative to each other. The second link axis is in a position where a first face of the plane faces the second link axis when wheel chock is in the wheel releasing configuration. Conversely, the second link axis is in a position where the other face of the plane faces the second link axis when the wheel chock is in the wheel securing configuration. Movement of the second link axis toward the plane in either direction causes the first and third link axes to move apart from each other. The first and third link axes are biased toward each other when a wheel is secured to the wheel chock and the wheel chock is in the wheel securing configuration such that a force is required to move the second link axis across the plane in order to place the wheel chock in the wheel releasing configuration.

Further features and advantages of the present invention, as well as the structure and operation of the preferred embodiment of the present invention, are described in detail below with reference to the accompanying drawings. Reference numerals in the written specification and in the drawing figures indicate corresponding items.

BRIEF DESCRIPTION OF THE DRAWINGS

The accompanying drawings, which are incorporated in and form a part of the specification, illustrate the preferred embodiment of the present invention and together with the description, serve to explain the principles of the invention. In the drawings.

DETAILED DESCRIPTION OF THE PREFERRED EMBODIMENT

Referring to the accompanying drawings, the preferred embodiment of a wheel chock 10 is illustrated by itself in FIGS. 1-6. The wheel chock 10 preferably comprises, among other things, a stationary body 12, a rocking body 14, and a locking mechanism 16.

Figure 1:
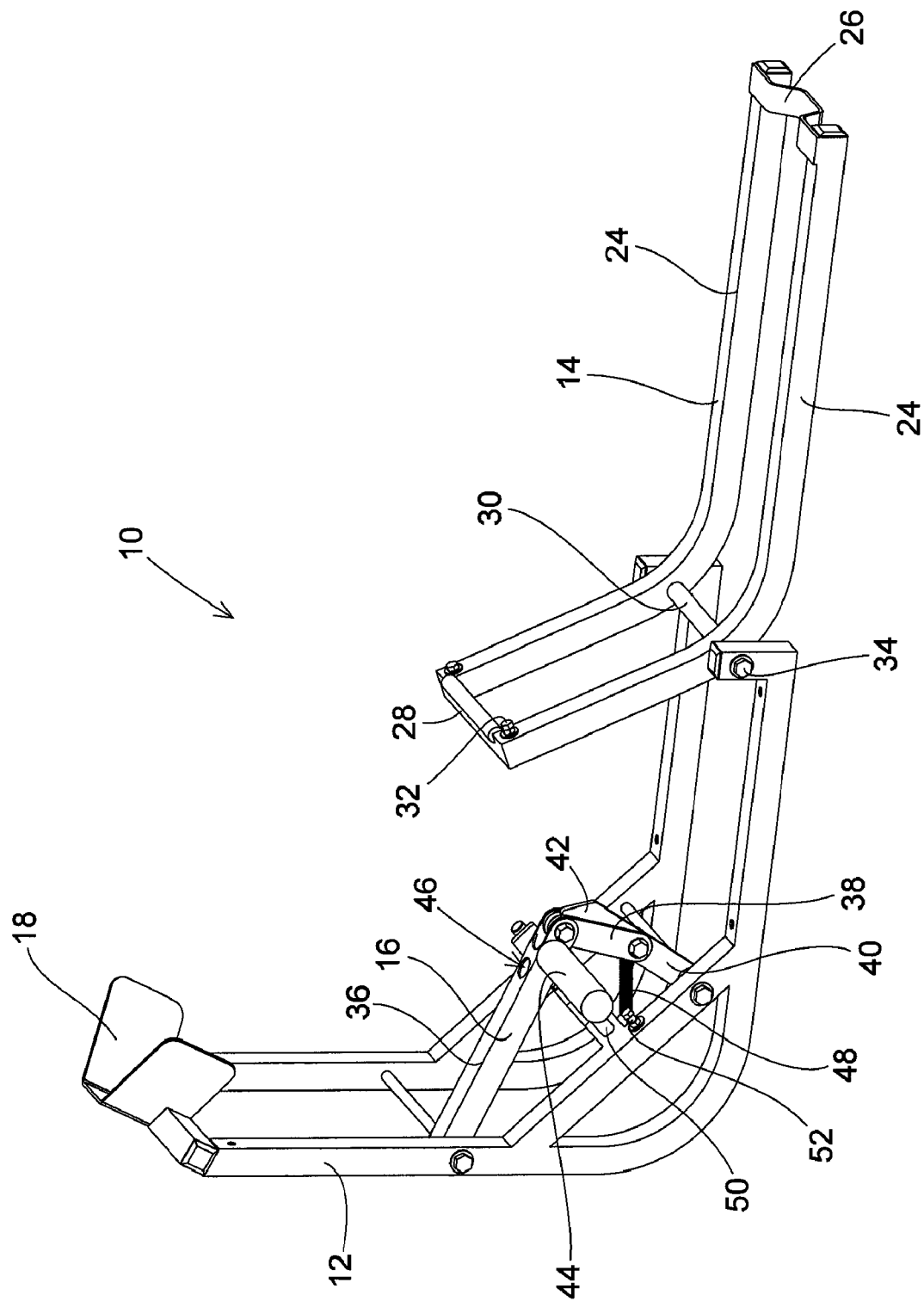
FIG. 1 illustrates a perspective view of the preferred embodiment of a wheel chock in accordance with the invention, showing the top, right side, and rear of the wheel chock with the wheel chock in its wheel receiving configuration.
Figure 2:
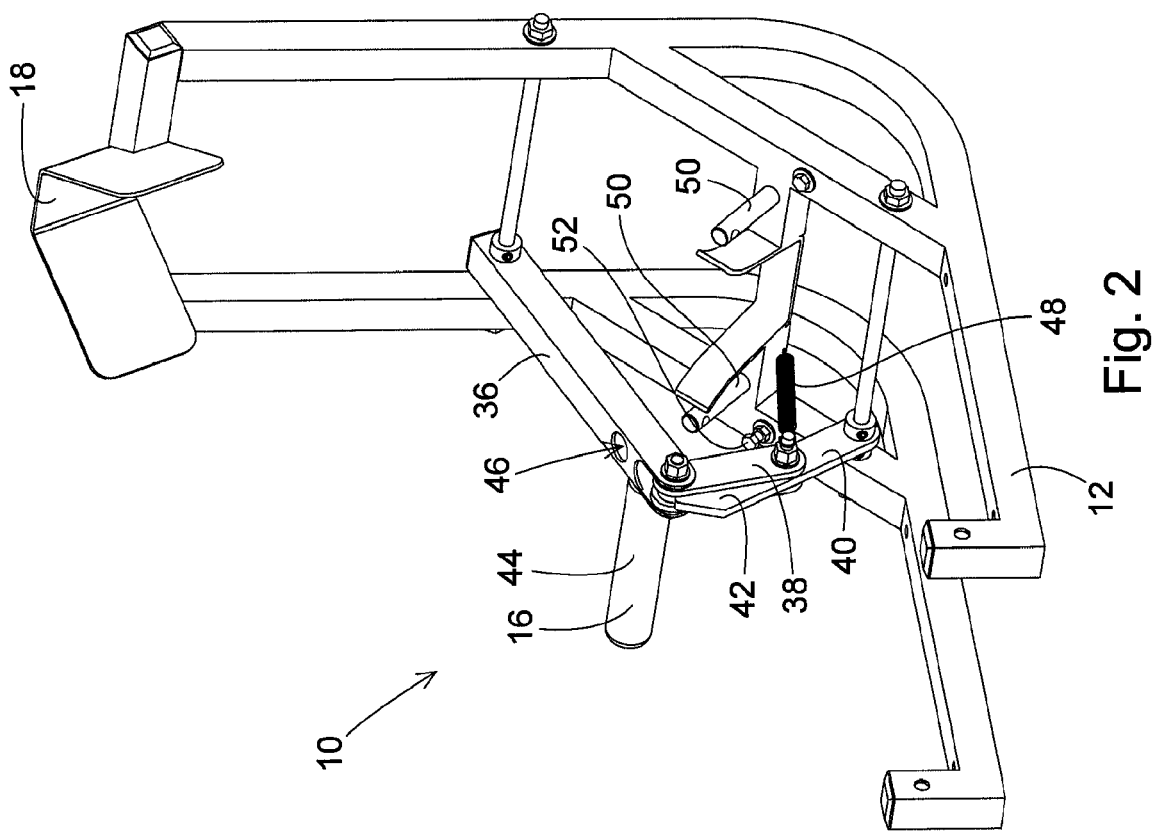
FIG. 2 illustrates a perspective view of the wheel chock shown in FIG. 1 with the rocking body omitted for clarity and shows the top, left side, and rear of the wheel chock.
Figure 3:
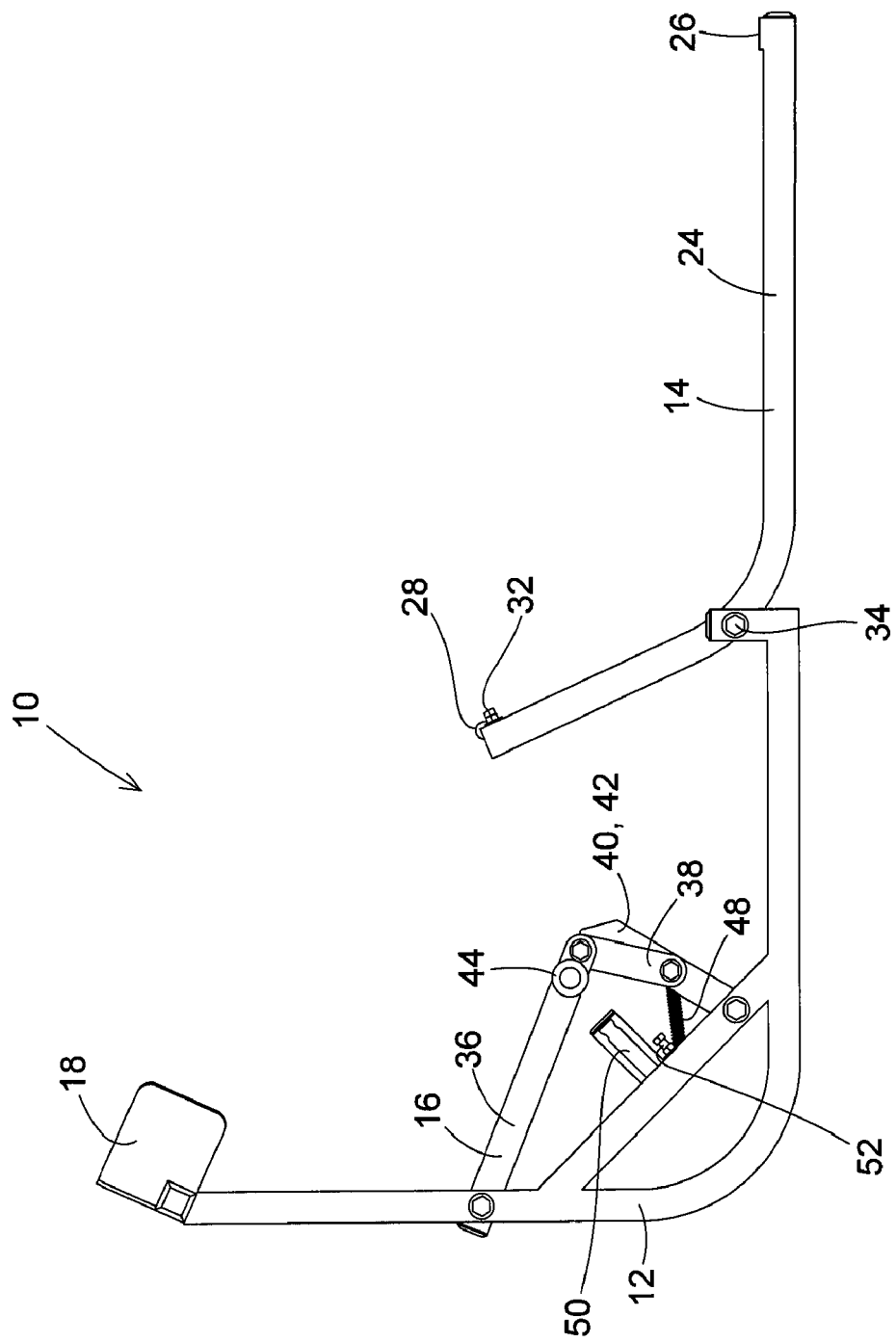
FIG. 3 illustrates a right side elevation view of the wheel chock shown in FIGS. 1 and 2.
Figure 4:
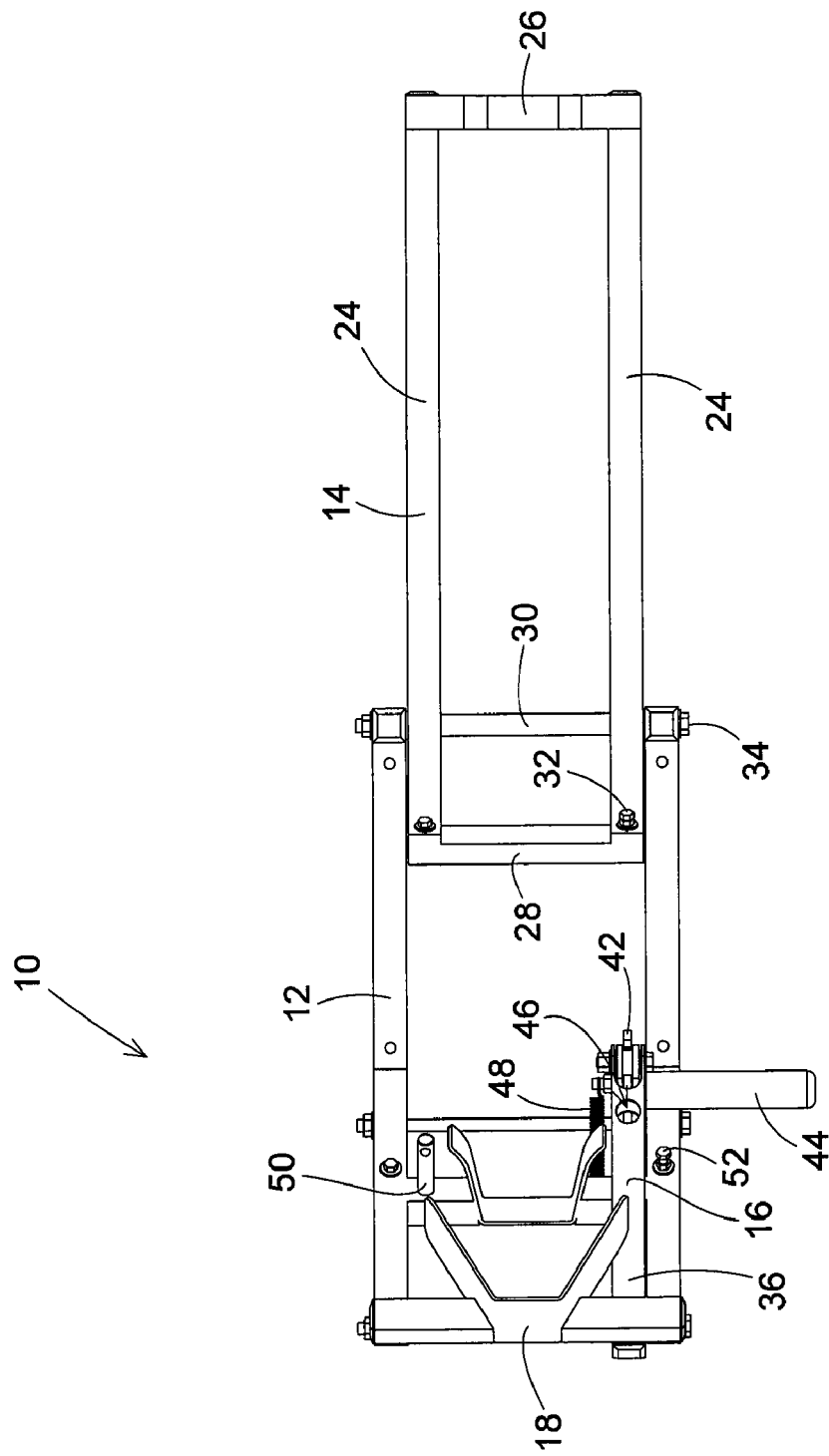
FIG. 4 illustrates a top plan view of the wheel chock shown in FIGS. 1-3.
Figure 5:
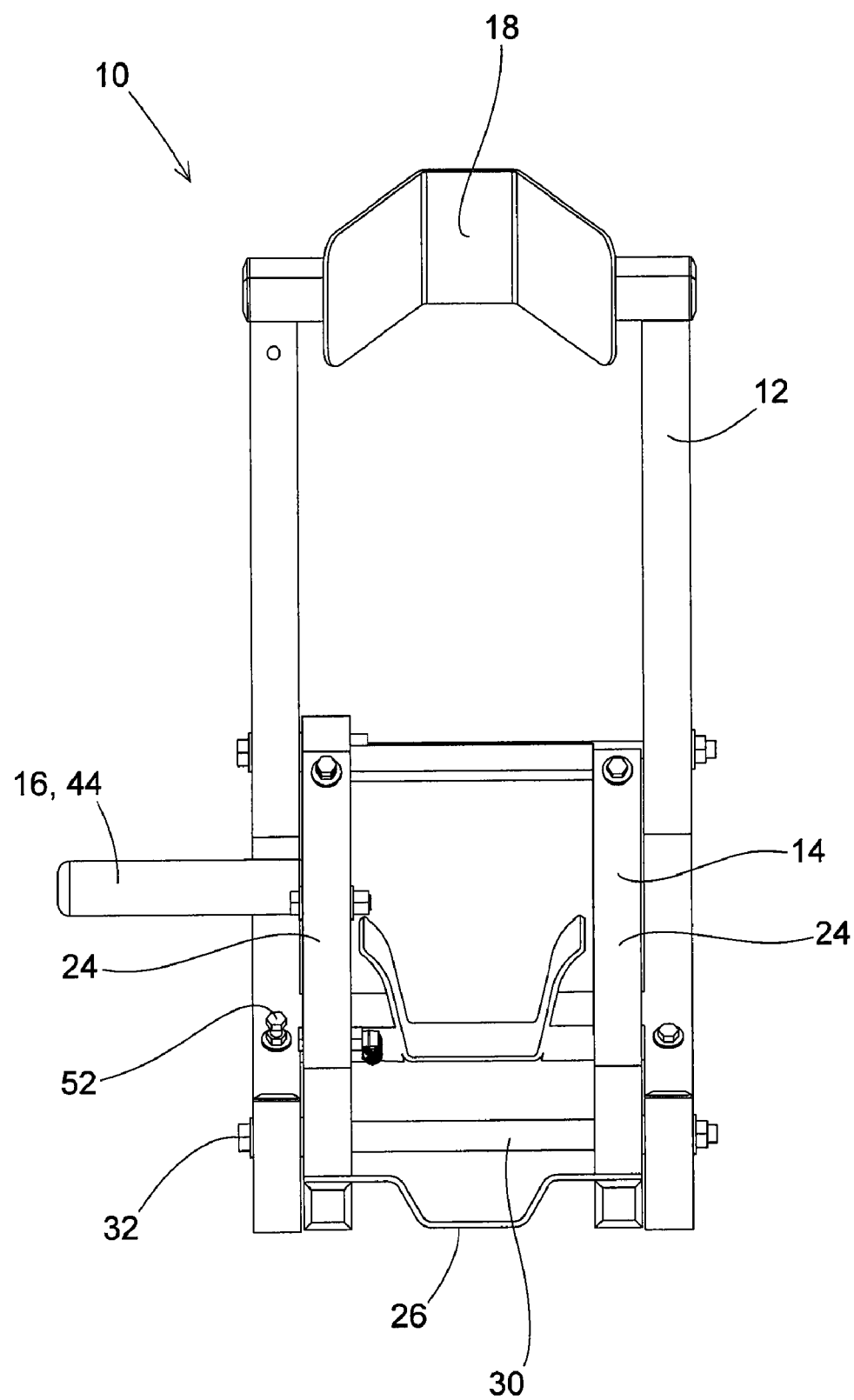
FIG. 5 illustrates a rear elevation view of the wheel chock shown in FIGS. 1-4.
Figure 7:
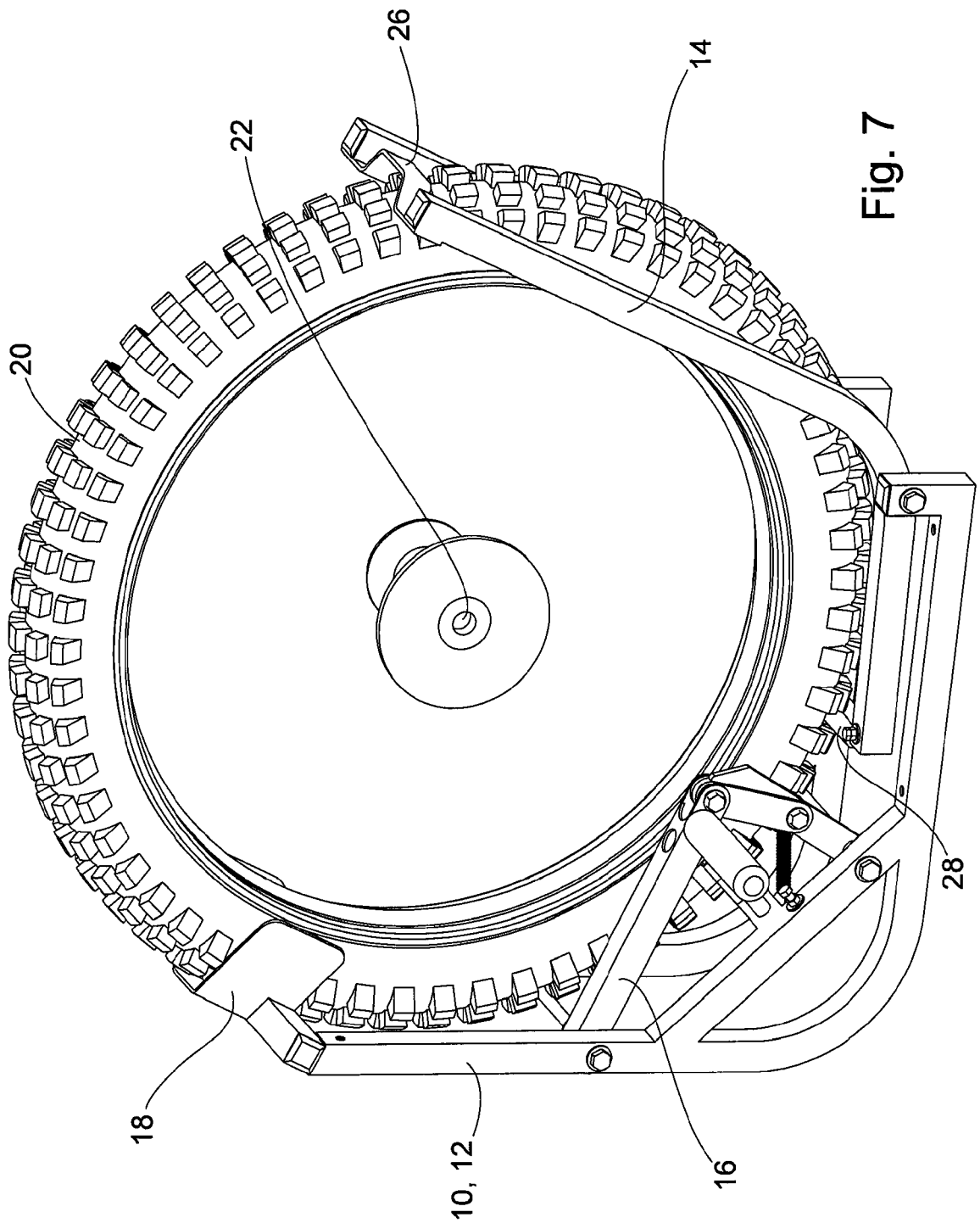
FIG. 7 illustrates a perspective view of a wheel positioned in a chocked position relative to the wheel chock shown in FIGS. 1-6, with the locking mechanism being in its non-locking configuration.
Figure 8:
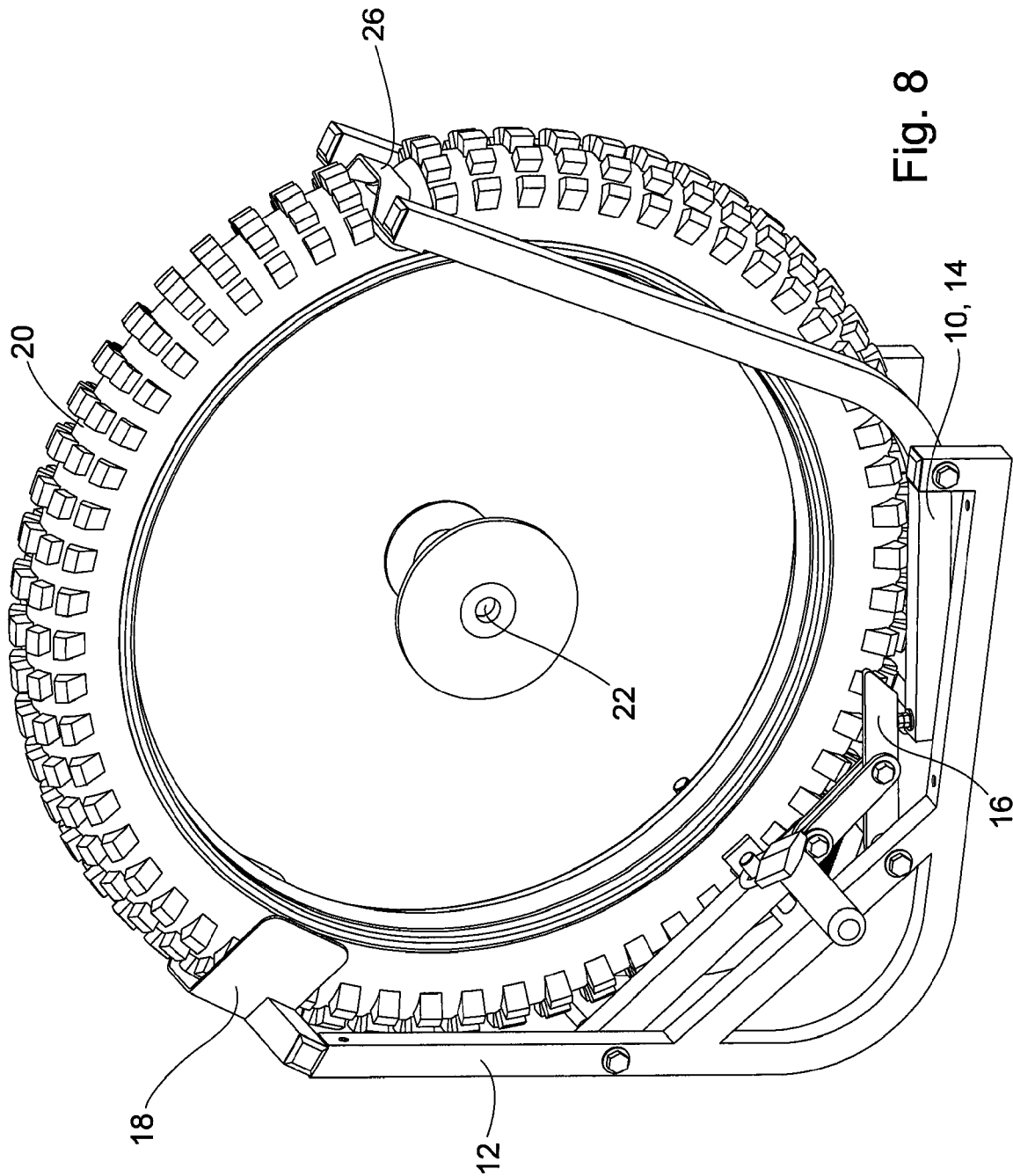
FIG. 8 illustrates a perspective view of a wheel positioned in a chocked position relative to the wheel chock shown in FIGS. 1-6, with the locking mechanism being in its locking configuration.
Figure 9:
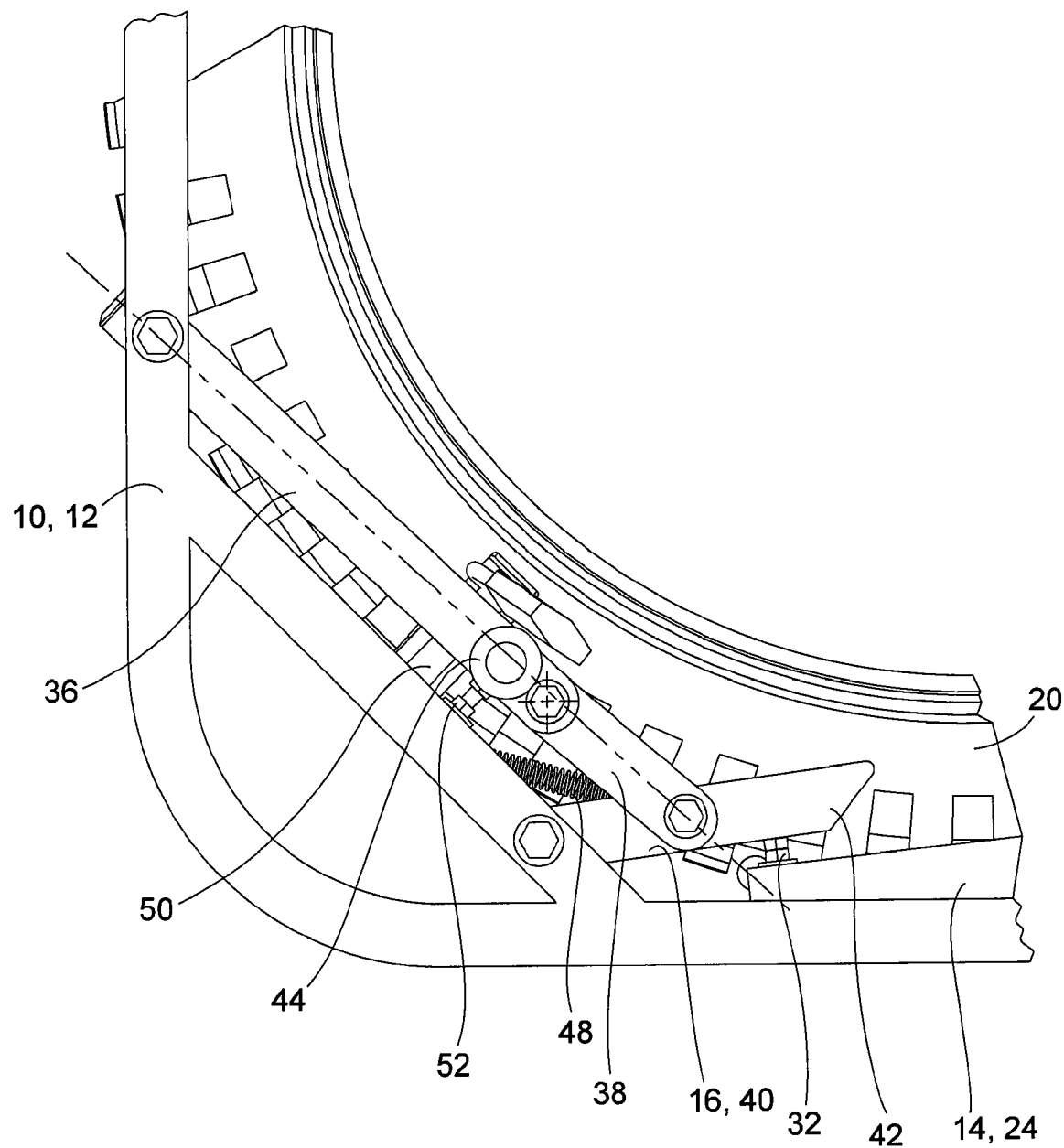
FIG. 9 illustrates a partial right side elevation view of the assembly shown in FIG. 8, emphasizing the locking mechanism being in its locking configuration.

The stationary body 12 is preferably formed primarily of welding steel square tubing and is configured to be bolted or otherwise attached to a surface, such as the bed of a trailer (not shown). The stationary body 12 is preferably L-shaped when viewed from the side, as shown in FIG. 3. A wheel receiving cup or pocket 18 is preferably formed near the top of the stationary body 12 and is adapted and configured to engage a wheel 20 when the wheel is in a chocked position (as shown in FIGS. 7-9). The wheel receiving cup 18 is preferably positioned at a height sufficient to cause the wheel receiving cup to engage the wheel 20 above the wheel's center of rotation 22 when the wheel is in the chocked position. As is explained in greater detail below, the wheel receiving cup 18 is also preferably configured to engage the sides of the wheel 20 when the wheel is in the chocked position.

The rocking body 14 of the wheel chock 10 is preferably formed mainly of welded steel tubing and is preferably L-shaped when viewed from the left or right side. The rocking body 14 preferably comprises two L-shaped main members 24, a portion of bent steel strip material joining the ends of the main members, and another piece of steel strip material joining the other ends of the main members. The portion of bent steel strip forms a wheel cup 26 and the other portion of strip material forms a wheel engagement member 28. Still further, the rocking body 14 preferably comprises a portion of cylindrical tubing 30 of plastic or metal spanning between the main members 24 where the main members are bent. A cylindrical hole (not visible in the drawing figures) is aligned with the cylindrical tubing 30 and extends through the rocking body 14. An adjustment member 32 is preferably attached to one of the main members 24 near the end of the main member that is opposite the wheel cup 26. The adjustment member 32 is preferably threadably height adjustable and includes a locknut to secure it at any particular height. The entire rocking body 14 is pivotally attached to the rear of the stationary body 12 via a bolt 34 that extends through the hole that passes through the cylindrical tubing 30 of the rocking body.

The locking mechanism 16 of the wheel chock 10 preferably comprises first 36, second 38, and third 40 links attached to one side of the stationary body 12 (shown attached to the right side of the stationary body). One end of the first link 36 is pivotally attached to the vertical tubing of the stationary body 12 of the wheel chock 10 about a first link axis. The other end of the first link 36 is pivotally connected to an end of the second link 38 about a second link axis. The other end of the second link 38 is pivotally connected to the third link 40 near the longitudinal midpoint of the third link about a third link axis. One end of the third link 40 is pivotally connected to a brace of the tubing of the stationary body 12 about a forth link axis. The opposite free end 42 of the third link 40 is cantilevered from the third link axis. The locking mechanism 16 also preferably comprises a manual actuation member 44 that extends sideways from one of the first and second links 36, 38 (shown attached to the first link) near the second link axis. The first link 36 is preferably formed from square steel tubing. The third link 40 is preferably formed from steel strip or bar. The second link 38 is preferably formed as two separate and identical steel strips spaced apart by the third link 40. Bolts preferably pivotally connect the links. The manual actuation member 44 is preferably formed as cylindrical piece of steel tubing and is preferably welded to the first link 36. The first link 36 also preferably comprises a through-hole 46 near the second link axis 38.

The wheel chock 10 also preferably comprises a spring 48, a pair of locking posts 50, and an over-center adjustment member 52. The spring 48 is used to bias the locking mechanism 16 toward its unlocking configuration (described below). One of the locking posts 50 is configured to extend through the through-hole 46 of the first link 36 of the locking mechanism 16 when the locking mechanism is in its locked configuration (described below) to thereby allow a means of preventing the locking mechanism from being moved into its unlocking configuration. The over-center adjustment member 52 that is attached to the stationary body 12 is preferably a threadably height adjustable member with a locknut similar to the adjustment member 32 of the rocking body 14 and is used to adjust the differential between the clamping force acting on the wheel when the locking mechanism 16 is in the locking configuration as compared to the maximum clamping force that occurs throughout the activation of the locking mechanism. All this is explained in greater detail in the following paragraphs that describe the use and operation of the wheel chock 10.

Figure 6:
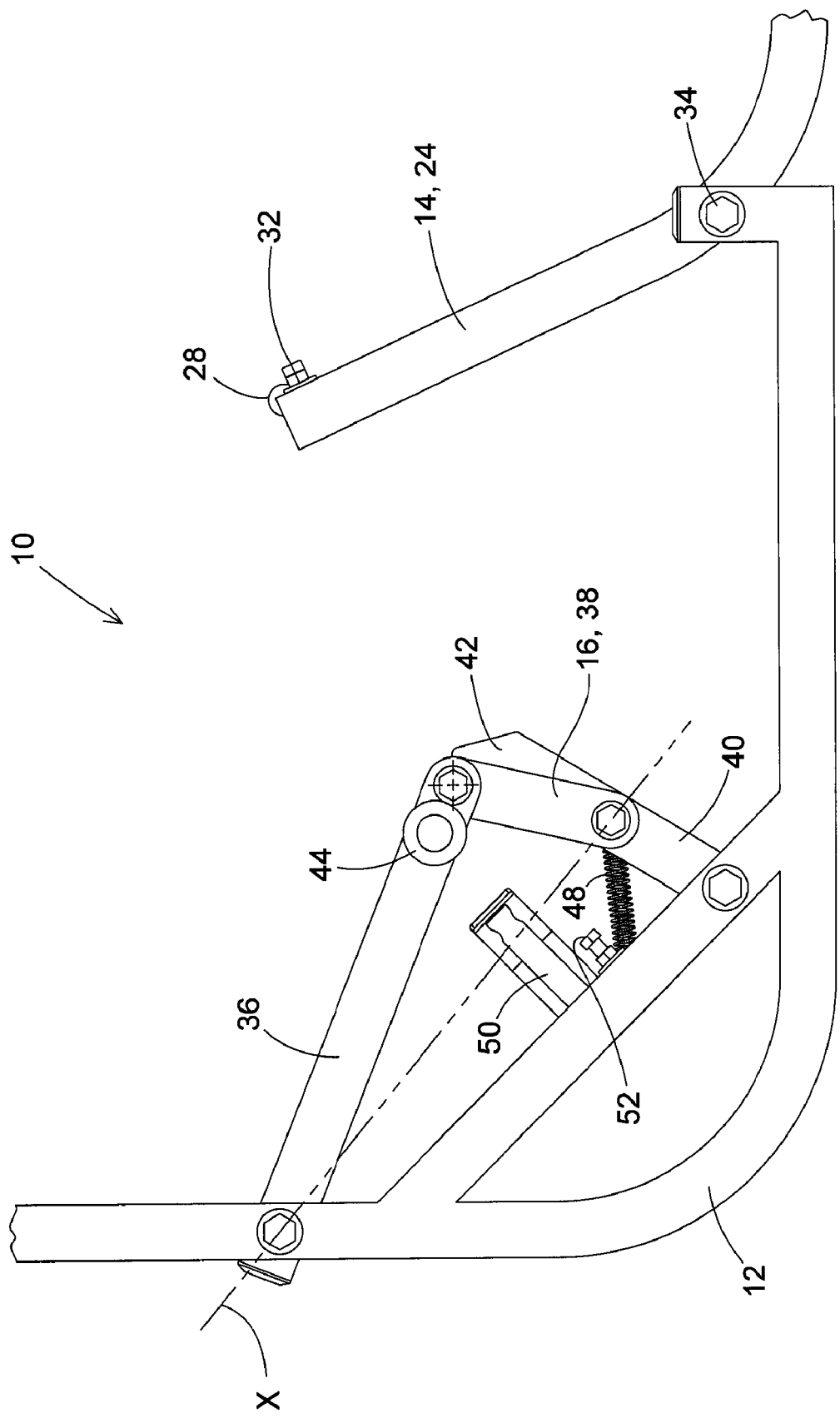
FIG. 6 illustrates a partial right side elevation view of the wheel chock shown in FIGS. 1-5, emphasizing the locking mechanism being in its non-locking configuration.

In use, the wheel chock 10 is preferably mounted to a surface, such as the bed of a trailer, via bolts (not shown). Prior to mounting a vehicle, such as a motorcycle, to the wheel chock 10, the wheel chock is placed in a wheel receiving configuration shown in FIGS. 1-6. In this configuration, the rocking body 14 is pivotally positioned relative to the stationary body 12 in a manner such that the ends of the main members 24 of the rocking body that support the wheel cup 26 of the rocking body rest on the surface upon which the wheel chock 10 is mounted. Additionally, the locking mechanism 16 is positioned in a non-locking configuration as shown in FIGS. 1-6. In the non-locking configuration, the spring 48 biases the third link 40 such that the third link is pivotally positioned relative to the stationary body 12 where it does not interfere with pivotal movement of the rocking body 14 relative to the stationary body. As shown in FIG. 6, in the non-locking configuration, the free end 42 of the third link 40 engages a cylindrical spacer that encircles the bolt that connects the first and second links 36, 38 and a thereby prevents the third link 40 from pivoting any further counter clockwise relative to the stationary body 12.

When the wheel chock 10 is in the wheel receiving configuration, a wheel 20 of a vehicle such as a motorcycle can be rolled onto the wheel chock, from the rear of the wheel chock, with little effort. As this occurs, the wheel 20 initial simply rolls over the wheel cup 26 of the rocking body 14 and eventually engages against the wheel engagement member 28 of the rocking body. Further rolling of the wheel 20 forward forces the wheel engagement member 28 downward which causes the rocking body 14 to pivot into the position shown in FIG. 7 relative to the stationary body 12. This pivoting also causes the wheel cup 26 of the rocking body 14 to engage the wheel 20 above the wheel's center of rotation 22. As shown in FIG. 7, eventually the wheel 20 contacts the wheel receiving cup 18 of the stationary body 12 and at such point, the wheel is in a chocked position. In this chocked position, the wheel 20 can not roll rearward out of the wheel chock 10 without also rising slightly to pass over the cylindrical tubing 30 of the rocking body 14. As such, gravity prevents the vehicle from rolling backward out of the chocked position. Additionally, in this position the cup like shape of the wheel receiving cup 18 of the stationary body 12 and the wheel cup 26 of the rocking body 14 prevent the wheel 20 from tilting to either side by engaging against the sides of the wheel. Thus, in the case of a two-wheeled vehicle, the wheel chock 10 is able to support the vehicle upright and the vehicle can be released as soon as the vehicle's wheel 20 reaches the chocked position.

At this point, the wheel 20 is not yet "fully secured" to the wheel chock 10 in that it can be removed from the wheel chock by simply rolling the wheel backward over the cylindrical tubing 30 of the rocking body 14. To be "fully secured" to the wheel chock 10, there must be no way of forcing the wheel 20 out of the wheel chock without breaking the wheel or the wheel chock. To fully secure the wheel 20, and hence the vehicle, to the wheel chock 10 of the preferred embodiment, the locking mechanism 16 is activated. To activate the locking mechanism 16, the manual actuation member 44 is preferably pushed downward via a person's foot until the first link 36 engages the over-center adjustment member 52.

To describe the operation of the over-center aspect of the locking mechanism, it is helpful to define a theoretical plane. The theoretical plane can be imaged as passing through and being parallel to the phantom line X of FIGS. 6 and 9, perpendicular to the plan of the drawing sheet. The phantom line extends through and is parallel to the first link axis and the third link axis. As can be seen from FIG. 6, when the locking mechanism 16 is in the non-locking configuration, the second link axis (shown with center line markings) is positioned to one side of the line X (i.e., to one side of the theoretical plane). In contrast, when the locking mechanism 16 is in the locking configuration (shown in FIG. 9), the second link axis is positioned to the other side of the line X (i.e., to the other side of the theoretical plane). It can be appreciated by one of ordinary skill in the art that movement of the second link axis toward the theoretical plane from either side of the plane causes the third link axis to move away from the first link axis. Thus, any force attempting to move the third link axis toward the first link axis will cause a reaction force that attempts to move the second link axis away from the theoretical plane.

In view of the forgoing, activation of the locking mechanism 16 causes the third link axis to move away from the first link axis. This in turn causes the third link to pivot clockwise (as viewed in FIGS. 6 and 9). At some point during this motion, the free end 42 of the third link 40 engages the adjustment member 32 of the rocking body 14. This causes the rocking body 14 to rotate slightly counterclockwise, thereby causing the wheel cup 26 of the rocking body to compress the wheel 20 (i.e., deform the tire of the wheel). Once the second link axis passes through the theoretical plane, the reaction force caused by the wheel 20 pushing back against the wheel cup 26 of the rocking body 14 acts to rotate the third link 40 counter-clockwise, and to thereby force the third link axis toward the first link axis. This in turn forces the second link axis downward and away from the theoretical plane until the first link 36 engages against the over-center adjustment member 52. At this point, the locking mechanism 16 is in its locking configuration, where the free end 42 of the third link 40 prevents the rocking body 14 from rotating back into the wheel receiving configuration.

It should be appreciated that, during activation, the locking mechanism 16 provides a mechanical advantage that allows a relative low force exerted on the manual actuation member 44 to cause a much higher compression force on the wheel 20. It should also be appreciated that the force reaches a maximum as the second link axis passes through the theoretical plane but that an appreciable compressive force remains when the locking mechanism 16 is in the locking configuration and the manual actuation member 44 is released.

When the locking mechanism 16 is in its locking configuration, one of the locking posts 50 extends through the through-hole of the first link 36. The locking post 50 itself has a through-hole that allows a padlock or other device to be secured therethrough (as depicted in FIGS. 8 and 9) in a manner preventing the first link 36 from moving off of the locking post 50. This helps prevents the vehicle from being stolen from the wheel chock 10 while also serves as an extra precautionary means of ensuring that the locking mechanism does not inadvertently move from its locking configuration to its non-locking configuration.

To release the wheel 20 from the wheel chock 10 after the locking mechanism 16 has been activated, an upward force is preferably applied to the manual actuation member 44 of the locking mechanism, preferably via the top of a person's foot pushing upward on the manual actuation member. It should be appreciated that this will cause the third link 40 of the locking mechanism 16 to rotate the rocking body 14 counter clockwise slightly and to compress the wheel 20 slightly more than it normally does when the locking mechanism is in the locking configuration. Once the second link axis passes upwardly through the theoretical plane, the reaction force of the compression of the wheel 20 and the tension of the spring 48 automatically moves the locking mechanism 16 the rest of the way into its non-locking configuration. After this occurs, the locking mechanism 16 no longer prevents the rotation of the rocking body 14 and the wheel 20 can be removed from the wheel chock 10 by forcibly rolling the wheel rearward and up and over the cylindrical tubing 30 of the rocking body 14. This places the wheel chock 10 back into the wheel receiving configuration. It should be appreciated that the closer the second link axis is to the theoretical plane when the locking mechanism 16 is in its locking configuration, the smaller the upwardly applied load to the manual actuation member 44 needs to be to move the second link axis through the theoretical plan (assuming the same clamping force acts upon the wheel when the wheel is fully secured). As such, adjusting the over-center adjustment member 52 adjusts the force required to unlock the locking mechanism.

It should be appreciated that the maximum amount that the wheel 20 is compressed during the activation of the locking mechanism 16 can be adjusted via the adjustment member 32 of the rocking body 14. This also allows the wheel chock 10 to accommodate other wheels of different diameters. It should also be appreciated that the wheel chock 10 is configured to be easily converted such that the locking mechanism can be repositioned on the left side of the wheel chock with only minor dismantling and reassembly, but with no need for other parts.

In view of the foregoing, it should be appreciated that the several advantages of the invention are achieved and attained. It should also be appreciated that, while the preferred embodiment is ideally suited for use in chocking two-wheeled vehicles, the claimed apparatus and methods may used for chocking vehicles having more or less wheels and therefore should not be construed as being limited in use to two-wheeled vehicles.

While the present invention has been described in reference to a specific embodiment, in light of the foregoing, it should be understood that all matter contained in the above description or shown in the accompanying drawings is intended to be interpreted as illustrative and not in a limiting sense and that various modifications and variations of the invention may be constructed without departing from the scope of the invention defined by the following claims. Thus, other possible variations and modifications should be appreciated.

Furthermore, it should be understood that when introducing elements of the present invention in the claims or in the above description of the preferred embodiment of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second and third should not be construed in a manner imposing any relative position or time sequence between limitations. Still further, the order in which the steps of any method claim that follows are presented should not be construed in a manner limiting the order in which such steps must be performed.

What is claimed is:

1. A method of chocking a wheel comprising:
   providing a wheel chock, the wheel chock comprising a stationary body and a rocking body, the stationary body being configured and adapted to be rigidly secured to a surface, the rocking body being pivotally connected to the stationary body;
   rolling a wheel into contact with the rocking body in a manner causing the rocking body to rotate to a wheel securing position relative to the stationary body and causing the wheel to reach a chocked position relative to the stationary body, the wheel being engaged with the stationary body when the wheel is in the chocked position; and thereafter,
   activating a locking mechanism that limits pivotal movement of the rocking body away from the wheel securing position relative to the stationary body, the activating occurring while the wheel is in the chocked position, the wheel being fully secured to the wheel chock when the pivotal movement to the rocking body away from the wheel securing position is limited relative to the stationary body and the wheel is in the chocked position, the locking mechanism comprises a manual activation member located to one lateral side of the wheel when the wheel is in the chocked position;
   the step of activating the locking mechanism comprises activating an over-center locking mechanism that limits pivotal movement of the rocking body away from the wheel securing position relative to the stationary body, the over-center locking mechanism being movable between opposite off-center position through a center position and being biased away from the center position when the wheel is in the chocked position, the over-center locking mechanism being activated by applying an external force to the manual activation member that cause the over-center locking mechanism to move from one of the off-center positions to the other off-center positions through the center position, the over-center locking mechanism comprising first and second links, the first link being pivotally connected to a first portion of the wheel chock about a first link axis, the first link being pivotally connected to the second link about a second link axis, the second link being pivotally connected to a second portion of the wheel chock about a third link axis, the first and third link axes defining a plane extending therethrough, movement of the second link axis toward the plane in either direction causing the first and third link axes to move apart from each other, the over-center locking mechanism being in the center position when the second link axis crosses the plane.

2. A method in accordance with claim 1 wherein one of the first and third link axes is fixed in position relative to the stationary body.

3. A method in accordance with claim 1 wherein the wheel is supported by the wheel chock in an upright position when the wheel is in the chocked position and prior to the step of activating the locking mechanism.

4. A method in accordance with claim 3 wherein gravity biases the wheel horizontally and vertically toward the chocked position when the wheel is in the chocked position and prior to the step of activating the locking mechanism.

5. A method in accordance with claim 1 wherein the step of activating the locking mechanism is performed via a person's foot, 6. A method of chocking a wheel comprising:
providing a wheel chock, the wheel chock being adjustable between a wheel receiving configuration and a wheel securing configuration, the wheel chock comprising an over-center locking mechanism, the over-center locking mechanism comprising a manual activation member;
rolling a wheel into contact with the wheel chock when the wheel chock is in the wheel receiving configuration, the rolling causing the wheel chock to adjust from the wheel receiving configuration to the wheel securing position as the wheel reaches a chocked position relative to the wheel chock, the manual activation member being located to one lateral side of the wheel when the wheel is in the chocked position;
activating the over-center locking mechanism in a manner securing the wheel chock in the wheel securing configuration when the wheel is in the chocked position by applying an external force to manual activation member, the over-center locking mechanism comprising first and second links, the first link being pivotally connected to a first portion of the wheel chock about a first link axis, the first link being pivotally connected to the second link about a second link axis, the second link being pivotally connected to a second portion to the wheel chock about a third link axis, the first and third link axes defining a plane extending therethrough, movement of the second link axis toward the plane in either direction causing the first and third link axes to move apart from each other.

7. A method in accordance with claim 6 wherein the wheel chock comprises a stationary body and a rocking body, the rocking body is pivotally connected to the stationary body, the step of rolling a wheel into contact with the wheel chock comprises rolling the wheel into contact with the rocking body in a manner causing the rocking body to pivot from a first position to a second position relative to the stationary body, and the step of activating the over-center locking mechanism prevents the rocking body from moving back into the first position.

8. A method in accordance with claim 6 wherein the wheel is supported by the wheel chock in an upright position when the wheel is in the chocked position and prior to the step of activating the over-center locking mechanism.

9. A method in accordance with claim 8 wherein gravity biases the wheel horizontally and vertically toward the chocked position when the wheel is in the chocked position and prior to the step of activating the over-center locking mechanism.

10. A method in accordance with claim 6 wherein the step of activating the over-center locking mechanism is performed via a person's foot.

* * * * *